United States Patent
Viola et al.

(10) Patent No.: US 7,267,697 B2
(45) Date of Patent: Sep. 11, 2007

(54) FUEL REFORMING INLET DEVICE, SYSTEM AND PROCESS

(75) Inventors: Michael Bart Viola, Macomb Township, MI (US); Changsoo Kim, Bloomfield Hills, MI (US); Calvin K. Koch, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 528 days.

(21) Appl. No.: 10/662,837

(22) Filed: Sep. 15, 2003

(65) Prior Publication Data

US 2005/0058593 A1    Mar. 17, 2005

(51) Int. Cl.
- B01J 8/04 (2006.01)
- B01J 7/00 (2006.01)
- F28F 28/00 (2006.01)

(52) U.S. Cl. .............. 48/61; 48/75; 48/127.9; 422/190; 422/211; 422/221; 423/650; 165/136

(58) Field of Classification Search ......... 48/189.4, 48/180.1; 422/232, 311
See application file for complete search history.

(56) References Cited

U.S. PATENT DOCUMENTS

| | | | | |
|---|---|---|---|---|
| 5,147,201 A | * | 9/1992 | Xiong | 431/326 |
| 5,916,529 A | * | 6/1999 | Scheuerman | 422/141 |
| 2002/0102192 A1 | * | 8/2002 | Ward | 422/181 |
| 2002/0150800 A1 | * | 10/2002 | Asou et al. | 429/20 |
| 2003/0159354 A1 | * | 8/2003 | Edlund et al. | 48/127.9 |
| 2004/0120847 A1 | * | 6/2004 | Dijkhuizen | 422/7 |

* cited by examiner

Primary Examiner—Glenn Caldarola
Assistant Examiner—Kaity V. Handal (57) ABSTRACT

A fuel reforming system includes an inlet device for a reactor having a housing defining a frustoconical interior region having an inlet opening and an outlet opening. A tube mixer having a helical divider may be optionally employed to transfer fluid into the inlet opening. A retention member is placed at each of the openings and a plurality of particles is contained within the frustoconical interior region between the retention members. An insulator placed between the outlet opening and the catalyst reaction surface minimizes temperature non-uniformities over the catalyst surface area, which preserves the catalyst contained within the reaction surface and prevents premature onset of the reaction prior to contact of a reactant mixture with the reaction surface. As a reactant fluid material passes through the inlet device it forms a homogenous reactant fluid material which then flows onto a catalytic reaction surface to form a reformate. Even distribution of the reactant fluid material onto the catalyst reaction surface provides uniform reactivity of the various components (e.g. fuel, air and exhaust gas mixture) comprising the reactant mixture, which helps reduce carbon build-up in the system and increases thermal efficiency.

12 Claims, 6 Drawing Sheets

FUEL REFORMING INLET DEVICE, SYSTEM AND PROCESS

BACKGROUND

The present disclosure relates to a reactor inlet, and, more particularly, to a reactor inlet for a fuel reforming system that provides a homogeneous mixture of fluids.

Several strategies are known in the art of fuel processing to improve fuel economy and comply with the Environmental Protection Agency (EPA) exhaust emission standards for a spark ignition engine. One such strategy is fuel reforming such as on-board steam reforming, autothermal reforming and partial oxidation reforming of gasoline. For example, gasoline partial oxidation (POx) reforming strategies involve mixing fuel, air and/or exhaust gas, and partially oxidizing the fuel with a catalyst to produce two primary products, hydrogen and carbon monoxide. The carbon monoxide may then be used as a fuel in a spark ignition engine, for example, whereas the hydrogen product may be used to run the engine with excess diluent either very lean with excess air or at stoichiometric air to fuel ratios with excess exhaust gas recirculation (EGR). Either scheme may result in increased fuel economy and lower oxides of nitrogen (NOx) emissions.

Hydrogen is highly flammable and produces lower engine-out emissions, such as undesirable oxides of nitrogen (NOx). A fuel reforming system generates $H_2$ from hydrocarbon fuels such as natural gas and gasoline, and alcohols such as methanol and ethanol.

Fuel reforming processes include steam reforming such as catalytic steam reforming, partial oxidation, and autothermal reforming. Steam reforming is an endothermic reaction wherein fuel is mixed with steam in the presence of a metal catalyst to produce $H_2$ and CO. Partial oxidation, an exothermic reaction, is used to process methane and higher hydrocarbons, as in $$CH_4 + \tfrac{1}{2}O_2 \rightarrow CO + 2H_2$$

which requires minimal external heat energy in a thermally efficient system. Autothermal reforming combines the endothermic steam reforming with the exothermic partial oxidation reaction, thereby balancing the heat flow into and out of the reactor.

Figure 1:
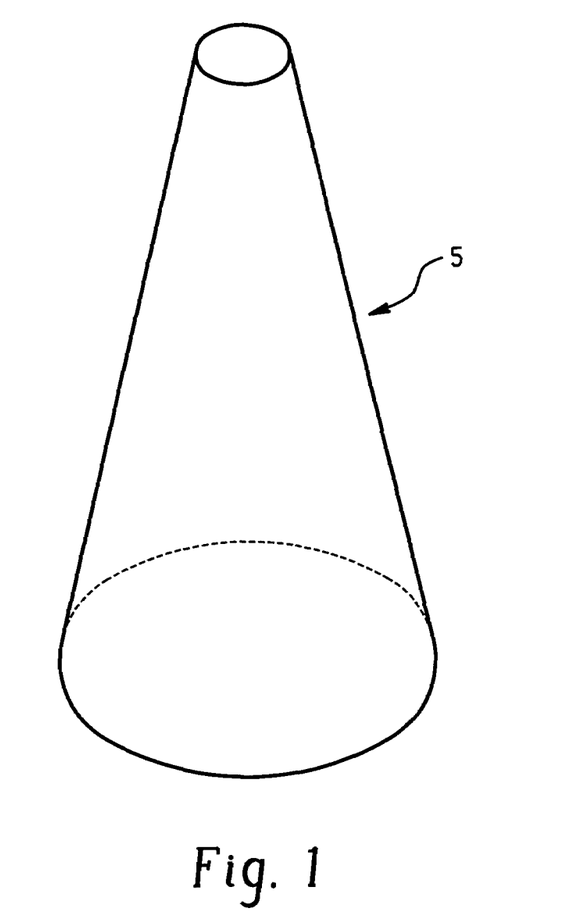
FIG. 1 is a perspective illustration of a ceramic foam inlet.

However, in order to produce as much hydrogen ($H_2$) and carbon monoxide (CO) as possible, a good homogeneous mixture of the reactants is desired as well as a means to evenly distribute that mixture over a catalyst. Prior art processes and fuel reforming systems often fail to provide a homogeneous mixture of reactants. A typical fuel reactor may rely on turbulence and/or flow dynamics to mix the reactants. Other known reactors include an inlet having a porous foam such as a ceramic foam to provide a mixture of reactants. As shown in FIG. 1, for example, a typical ceramic foam inlet is shown generally as 5 may comprise a cone shaped insert of varying cone angles and materials for the passage of fluid. However, ceramic foam often has non-uniform porosity and/or blockage of pore space. The ceramic foam inlet 5 fails to provide a homogeneous mixture of the reactants. Accordingly, there remains a need in the art for improved fuel reformer systems and processes for providing a homogeneous reactant mixture and increase thermal efficiencies associated with the homogeneous mixture.

BRIEF SUMMARY

Disclosed herein is an inlet device. The inlet device comprises a housing defining a frustoconical interior region having an inlet opening and an outlet opening. A first retention member in fluid communication with the inlet opening and a second retention member in fluid communication with the outlet opening. A plurality of particles is contained within the frustoconical interior region between a first retention member and a second retention member.

In accordance with another embodiment, a fuel reforming system includes an inlet device comprising a housing defining a frustoconical interior region having an inlet opening to and an outlet opening, a first retention member in fluid communication with the inlet opening and a second retention member in fluid communication with the outlet opening, a plurality of particles contained within the frustoconical interior region between the first retention member and the second retention member, and reaction surface in fluid communication with the outlet opening.

Also disclosed is a method for providing a mixture of materials in a fuel reforming process comprising flowing a fluid material into an inlet device comprised of a housing defining a frustoconical interior region having an inlet opening and an outlet opening, a first and a second retention member, the first retention member in fluid communication with the inlet opening and the second retention member in fluid communication with the outlet opening, and a plurality of particles contained within the frustoconical interior region between the first retention member and the second retention member to form a reactant mixture; and reacting the reactant mixture with a reaction surface to form a reformate.

The above described and other features are exemplified by the following figures and detailed description.

BRIEF DESCRIPTION OF THE DRAWINGS

Referring now to the figures, which are meant to be exemplary embodiments, and wherein the like elements are numbered alike.

DETAILED DESCRIPTION OF THE PREFERRED EMBODIMENT

In a fuel reforming process a fluid material, which is typically a mixture of different fluids, is preferably homogeneously mixed prior to entering the reactor to assure the consistency of the products exiting the reactor and also preserve the internal components of the system. Disclosed herein is an inlet device that provides a homogeneous fluid material to the reactor, which provides uniform distribution of fluid material to a catalyst material disposed in the reactor. The even distribution of fluid material maximizes the production of hydrogen ($H_2$) and carbon monoxide (CO), and provides greater thermal efficiency.

Figure 2:
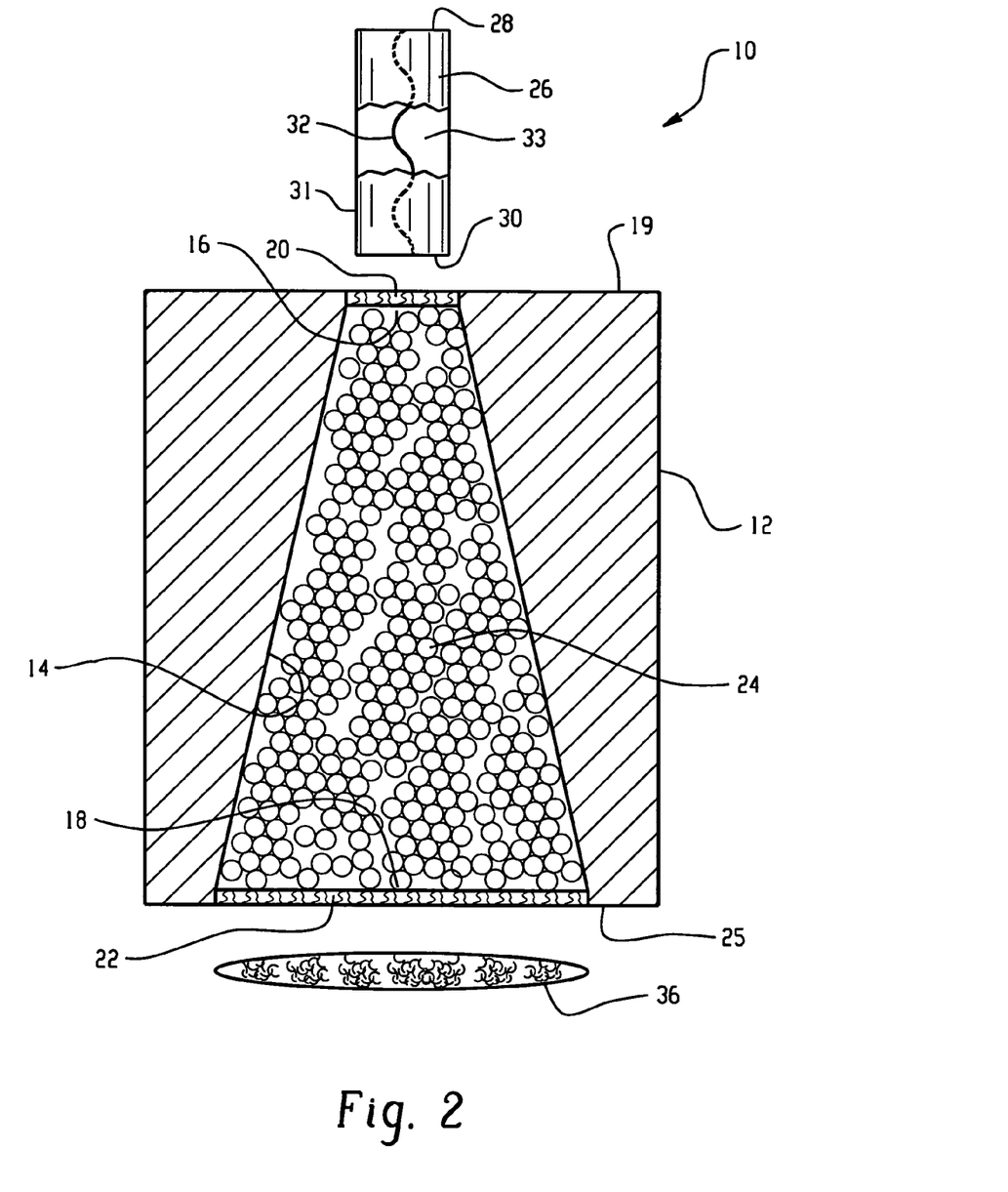
FIG. 2 is a general perspective view of an inlet device in accordance with the present invention.

Referring now to FIG. 2, there is depicted an inlet device generally designated as reference numeral 10. Advantageously, the inlet device 10 may be used in combination with a fuel reformer reactor to provide the reactor with a homogeneous fluid material. The inlet device 10 generally includes a housing 12 defining a frustoconical interior region 14 having an inlet opening 16 and an outlet opening 18. The housing 12 may comprise an upper surface 19 and a lower surface 25, and be any of a variety of shapes and designs that allow the inlet device 10 to operate in a fuel reforming process. In one embodiment, the housing 12 is cylindrically shaped and defines an axially extending frustoconical interior region 14. The housing 12 is not intended to be limited to any particular shape. Other housing 12 shapes may include square, rectangular, oval, and the like. The exact shape of the housing 12 is determined by the desired application. The housing 12 is preferably comprised of a material suitable for the environment in which the inlet device 10 is intended to be used so as to provide long life and functionality to the inlet device 10. In one embodiment, the housing 12 comprises a stainless steel material and is employed in a fuel reforming process. Other suitable materials are known to those skilled in the art.

As used herein, the term "frustoconical" is given a general meaning known in the art to include a cone having a frustum. The term "cone" generally refers to an area bounded by a region enclosed within a closed curve, on a plane, and a surface formed by the segments joining each point of the closed curve to a point which is not on the plane. The term "frustum" generally refers to a basal portion of a solid cone or pyramid formed by cutting off the top or point by a parallel plane to the base and is often the part of a solid intersected between two usually parallel planes.

The frustoconical interior region 14 comprises and inlet opening 16 and an outlet opening 18 for the transfer of fluids into and out of the inlet device 10. In one embodiment, the inlet opening 16 comprises a diameter less than the diameter of outlet opening 18 and provides a uniform flow of fluid material from a narrow to a wider channel. In another embodiment, the inlet opening 16 is positioned at an upper surface 19 of the housing 12, and the outlet opening 18 is located at a lower surface 25 of the housing 12.

The frustoconical interior region 14 preferably has a cone angle of about 20 to about 80 degrees, with a cone angle of about 30 to about 70 degrees more preferred, with a cone angle of about 30 to about 50 degrees even more preferred, and with a cone angle of about 30 to about 40 degrees most preferred. In one embodiment, the frustoconical interior region 14 comprises about a 40 degree cone angle, within the inlet opening 16 has a smaller diameter wherein the outlet opening 18.

The inlet device 10 preferably comprises a first retention member 20 in fluid communication with the inlet opening 16, and a second retention member 22 in fluid communication with the outlet opening 18. These components are shown in FIG. 2, and various Figures herein, as being in direct physical contact with one another. However, it is known to those skilled in the art that the inlet device 10 of the present disclosure will function even if one or more layers, seals, and/or components are disposed there between as long as these components are in fluid communication with one another. Both the first and second retention members 20, 22 are preferably porous to permit fluid transfer of fluid material into and out of the inlet device 10, while preventing other materials, i.e. particulate matter from entering and/or exiting the inlet device 10. The first and second retention members 20, 22 are preferably fabricated from a material suitable for the environment in which the inlet device 10 is to be employed. In a fuel reforming process environment, the inlet device 10 is preferably fabricated from a material that is resistant to high temperature oxidation. Suitable materials for such an environment include, but are not limited to ceramics and/or metals (e.g., mesh screens). The selection of material will be determined by the desired application and the composition of other components, such as the catalyst material employed in the fuel reforming reactor. An exemplary suitable material for the first and second retention members 20, 22 is a stainless steel mesh screen, such as 316 stainless steel mesh screen including Dyno-Pore™ 380 micrometer SCM 316 SS mesh screen.

The inlet device 10 further comprises a plurality of particles 24 disposed in the frustoconical interior region 14 between the first and second retention members 20, 22. The particles 24 are preferably contained within the frustoconical interior region 14 without the use of pressure force by the first and second retention members 20, 22. The particles 24 may be any of a variety of suitable shapes, including spherical, oval, cubic and rectangular, which allow the particles 24 to pack the frustoconical interior region 14 while allowing fluid material to pass through the particles 24, and out the outlet opening 18. Generally, a spherical shape may generate regular, uniform packing within the frustoconical interior region 14, while other shapes may demonstrate less uniform packing. Preferably, the diameter of the plurality of particle 24 are about 0.1 to about 0.01 of the inlet length (L), wherein inlet length refers to the axial or vertical length extending from the inlet opening to the outlet opening of the frustoconical interior region.

The plurality of particles 24 preferably comprise a chemically inert material which does not deform, and/or result in a change in the porosity of the plurality of particles 24 within the frustoconical interior region 14 under high temperatures, for example, at temperatures of about 300° C. to about 1100° C. Suitable materials include ceramic compositions having silica, silicon carbide, alumina, and/or other inorganic oxides such as zirconia and mixtures thereof which can maintain dimensional stability and chemical inertness in the previously mentioned temperature range. In a preferred embodiment, the plurality of particles 24 comprise zirconium oxide.

Optionally, a tube mixer 26 is disposed in fluid communication with the inlet opening 16 of the inlet device 10. The tube mixer 26 preferably has an inlet 28 to receive fluid material into the tube mixer 26 and an outlet 30 to transfer fluid material out of the tube mixer 26 and into the inlet opening 16. The tube mixer 26 preferably comprises a cylindrically shaped tube 31 with a helical shaped divider 32 longitudinally disposed within an interior region 33 of the cylindrically shaped tube 31. The tube mixer 26 may be comprised of stainless steel material. A suitable tube mixer 26 is commercially available under the trademark Koflow™ from the Cole-Parmer Instrument Company, which comprises a stainless steel tube with a flat piece of stainless steel within the tube and twisted to form a helix. Other suitable tube mixer 26 designs are known to those skilled in the art.

The inlet device 10 may also comprise an insulator 36 positioned proximate to the outlet opening 18 of the housing 12. Suitable insulators 36 include any of a variety of lightweight high temperature thermal shields that are heat resistant up to at least about 1100° C. and are easily permeable with a minimal pressure drop at high flow rates, such as pressure drop less than about 50 kPa, more preferably less than 10 kPa at various acceptable flow rate. The insulator 36 is preferably nonflammable, resistant to oxidation and chemically inert with regards to other materials during processing and application, while providing an acceptable temperature gradient. A suitable insulator 36 is a ceramic fabric, foam or monolith, such as but not limited to 3M™ Nextel™ Braided Sleeving 312, and 3M™ Nextel™ Ceramic Fiber 312,440,550,610,650 and 720. The choice of insulator 36 will be determined by the reforming process and/or desired application.

Figure 3:
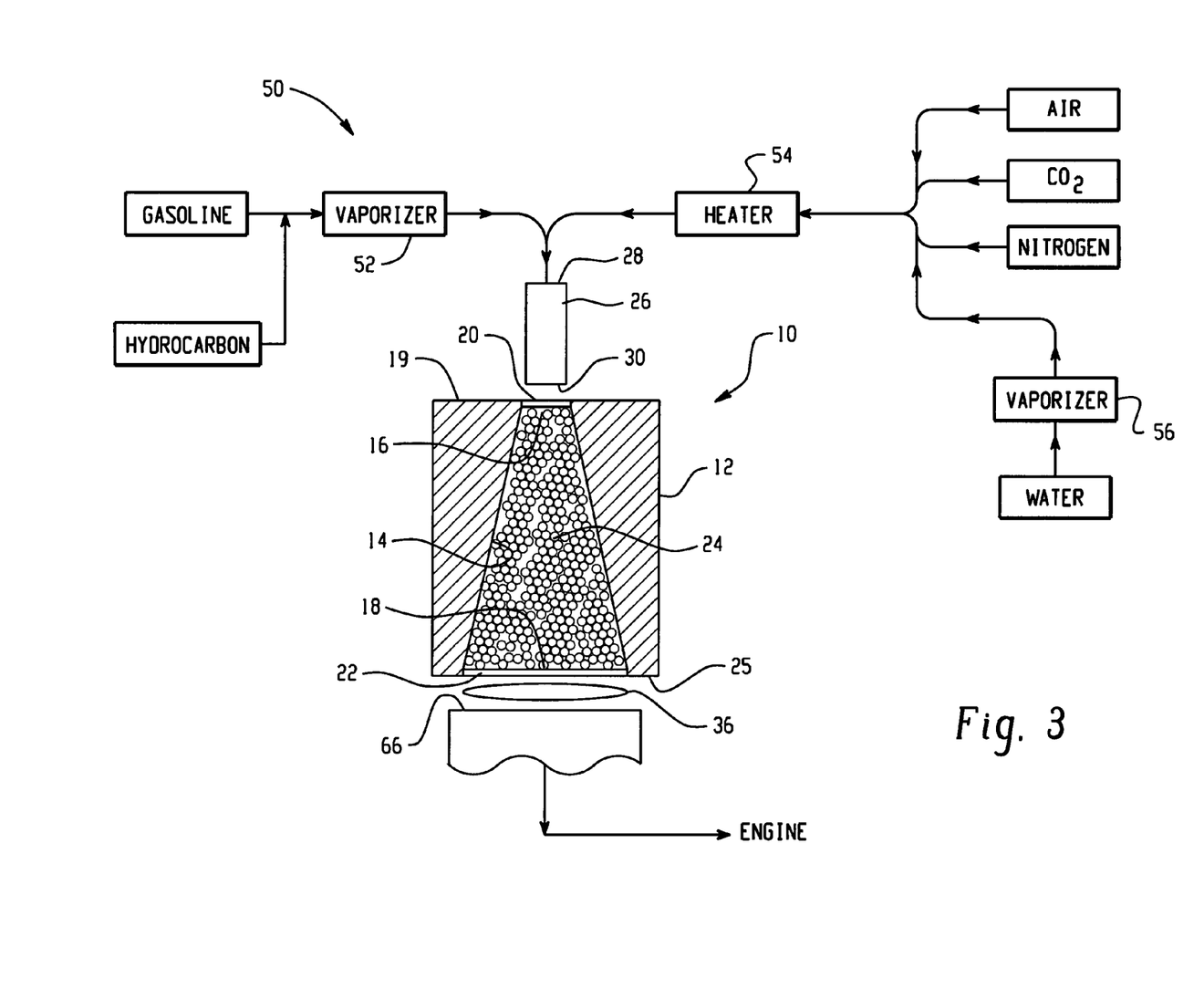
FIG. 3 is a schematic view of a fuel reforming system in accordance with the present invention.

Now turning to FIG. 3, a schematic view of a fuel reforming system 50 is shown. The fuel reforming system 50 generally includes the inlet device 10 in fluid communication with a reaction surface 66. As shown in FIG. 3, the fuel reforming system 50 forms a reformate comprising hydrogen, carbon monoxide and small amounts of light hydrocarbons, water vapor, carbon dioxide, nitrogen and heat from the reaction of a fuel, air and/or exhaust gas mixture. The fuel generally comprises a hydrocarbon composition in a liquid and/or vapor form. An exemplary fuel is gasoline. The exhaust gas mixture generally comprises oxygen, nitrogen, carbon dioxide, water vapor and/or combinations thereof.

In one embodiment, the fuel passes through a vaporizer 52. The air and exhaust gas mixture emission pass through a heater 54 and/or vaporizer 56 before combining with the fuel. In the fuel reforming system 50, such as gasoline reforming, both vaporizers 52, 56 maintain a temperature of about 220° C. to about 250° C. The air and exhaust gas pass through a heater 54, then enter a tube mixer 26, and reach a temperature of about 325° C., above the light-off temperature of the reaction. The term "light-off" temperature as used herein is given the ordinary meaning known to those skilled in the art as the temperature at which the reaction begins.

The fuel, air, and/or exhaust gas mixture flow into the inlet 28 of the tube mixer 26 and combine to form a fluid material. The tube mixer 26, which may be positioned adjacent to the upper surface 19 of the housing 12, mixes the different fluids forming a reactant fluid material, which is then transferred from the outlet 30 of the tube mixer 26 to the inlet opening 16 of the inlet device 10. As the reactant fluid material passes through the first retention member 20 and into the frustoconical interior region 14, the particles 24 therein remain in a conical formation as defined by the frustoconical interior region 14 of the housing 12. The reactant fluid material passes among the particles 24 toward the outlet opening 18 to provide homogeneous mixing of the fluid material. The reactant mixture passes through the second retention member 22 by way of the outlet opening 18. The term "homogeneous" is given the ordinary meaning known to those skilled in the art.

A reaction surface 66 cooperates with the outlet opening 18 of the frustoconical interior region 14. As the reactant mixture flows out of the outlet opening 18 it reacts with the reaction surface 66 to form the reformate. The reaction surface 66 is preferably formed of a catalyst material which catalytically initiates the reaction to form the reformate from the reactant mixture. Suitable catalyst materials include those known to one skilled in the art of fuel reforming such as a heterogeneous catalyst in granular, monolith, foam, and/or particulate form. The reaction surface 66 preferably has at least the shape and diameter of the outlet opening 18. The catalyst material selected preferably provides a low-pressure drop and does not sinter at a temperature below about 1100° C.

In one embodiment, the fuel reforming system 50 comprises an insulator 36 proximate to the outlet opening 18. In this embodiment, the reactant mixture flows from the outlet opening 18 to the insulator 36 prior to reaching the reaction surface 66. The insulator 36 may protect the bottom surface 25 of the housing 12 from exposure to high temperatures, such as about 800° C. and higher, and possible oxidation of the second retention member 22 during processing.

As previously discussed, fuel reforming may be exothermic, as in partial oxidation reactions, and therefore liberate heat during the formation of the reformate. Once this type of exothermic process is running, minimal external heat is required to sustain the reaction. When stoichiometries are set to produce $H_2$ and CO, sudden temperature increases which will favor $H_2O$ and carbon formation rather than $H_2$ are preferably avoided. The insulator 36 may also reduce the transfer of heat to the inlet device 10 that prevents the reactant mixture from starting an autoignition reaction prior to reaching the reaction surface 66. In partial oxidation reactions, the reactant mixture may deleteriously begin partially oxidizing fuel before reaching the catalyst, thereby reducing thermal efficiencies.

The following Examples illustrate a comparison of a prior art ceramic foam fuel reforming system and a fuel reforming system in accordance with the present disclosure. The prior art ceramic foam comprised ceramic foam inlet designs available from the Selee Corporation. These Selee® ceramic foam inlets are composed of zirconia-toughened-alumina (ZTA) foam, having a composition of about 10.0 weight percent (wt. %) zirconia and about 90.0 wt. % alumina, based on total composition weight, and about 20 ppi (pores per linear inch). The ceramic foam inlets having cone angles of about 40 degrees, 50 degrees and 70 degrees and the inlet device of the present disclosure having a cone angle of about 40 degrees and about 30 degrees were compared. The inlet device of the present examples comprised a stainless steel housing defining a frustoconical interior region and zirconium oxide beads therein. The examples do not limit the present disclosure and results are merely illustrative and may vary.

EXAMPLE 1

Figure 4:
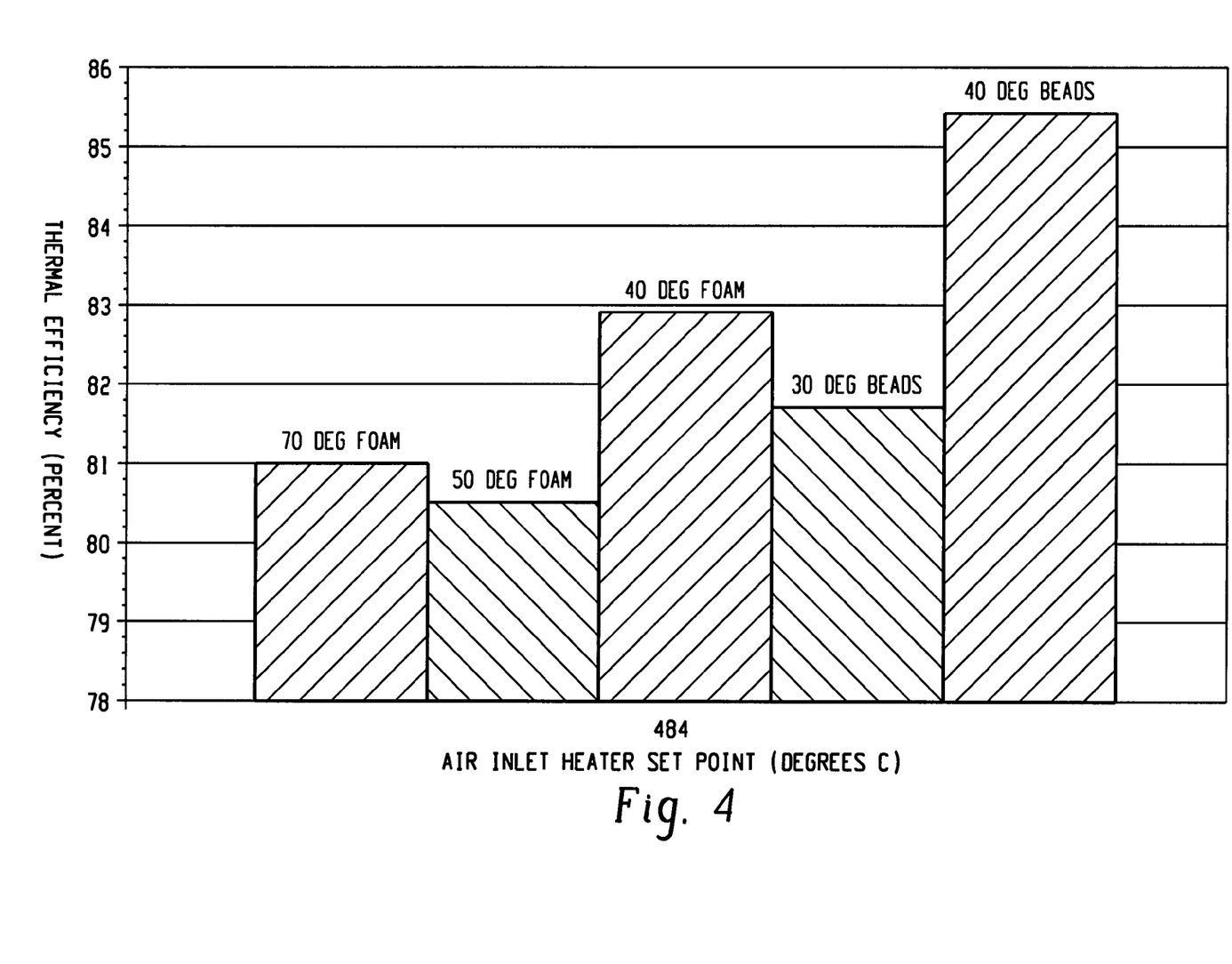
FIG. 4 is a bar graph illustrating the thermal efficiency with: 70 degree ZTA foam; 50 degree ZTA foam; 40 degree ZTA foam; 30 degree inlet with beads; and 40 degree inlet with beads.

As FIG. 4 graphically illustrates thermal efficiency of the various systems set at an air inlet heater set point of about 484° C. The results clearly show the improvements in thermal efficiencies relative to a ZTA ceramic foam inlet fuel reforming system. The inlet device 10 comprising zirconium oxide beads contained within a frustoconical interior region having about a 40 degree cone angle resulted in a thermal efficiency of over 85% compared to a ZTA ceramic foam inlet design having a cone angle of about 40 degrees that exhibit efficiencies of less than 83%.

EXAMPLE 2

Figure 5:
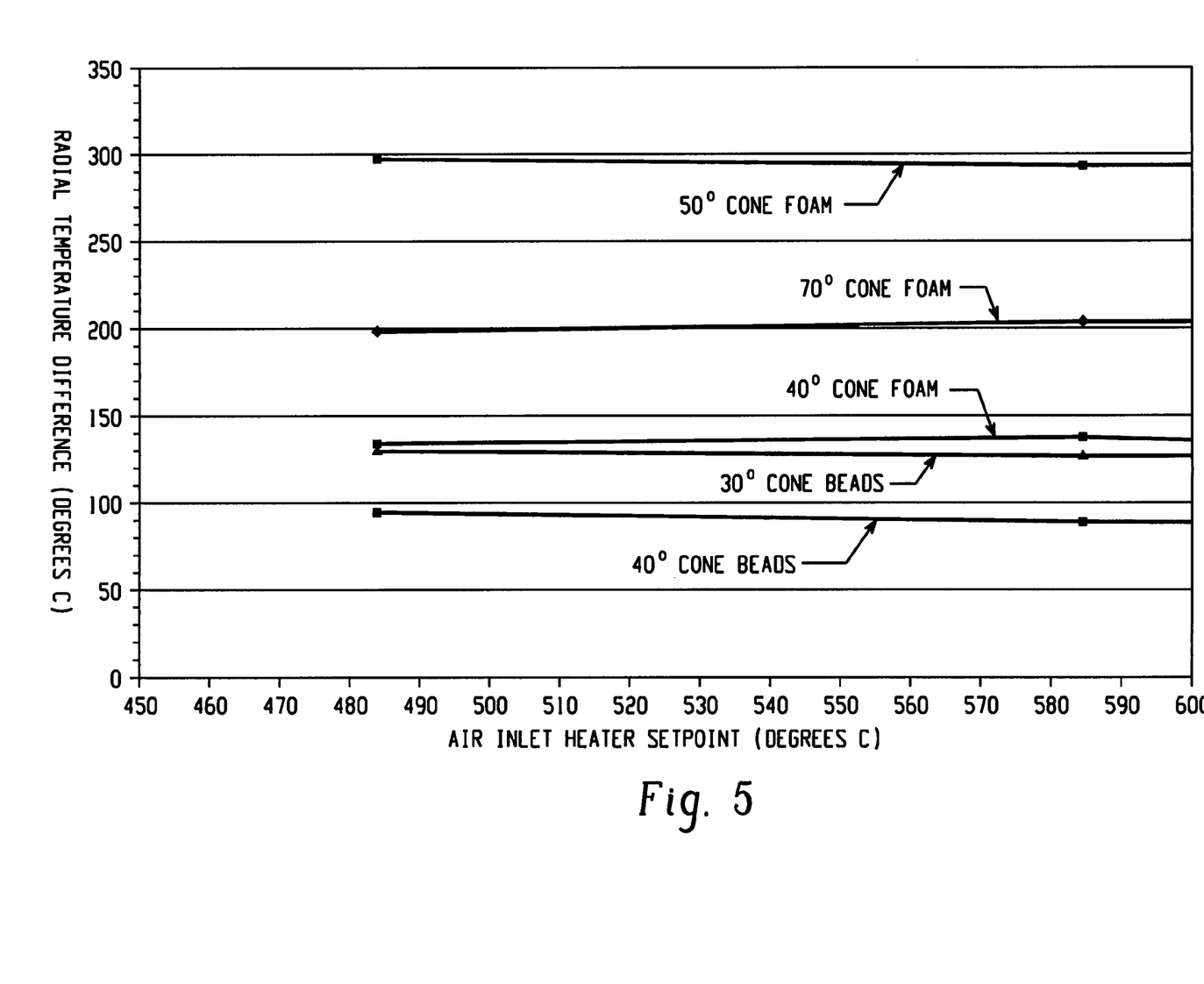
FIG. 5 is a line graph illustrating the radial temperature differences, measured in degrees Celcius with: 70 degree ZTA foam; 50 degree ZTA foam; 40 degree ZTA foam; 30 degree inlet with beads; and 40 degree inlet with beads.

In this example, a radial temperature comparison of the ZTA foam and the inlet device of the present disclosure. As FIG. 5 graphically illustrates, a fuel reforming system 50 comprising the inlet device 10 having the frustoconical interior region with about the 40 degree cone angle, zirconium oxide beads disposed therein and the insulator provided improved thermal efficiency relative to a ZTA foam inlet system. Moreover, a small catalyst radial difference provided a homogeneous mixture distribution over the catalyst. In this embodiment, the system 50 demonstrated an acceptable temperature gradient of about 400° C. over the catalyst. As shown in FIG. 4, a linear graph of radial temperature difference, the least difference occurred with an inlet device having a frustoconical interior region cone angle of about 30 to about 40 degrees.

EXAMPLE 3

In this example, a comparison of ethylene production in the ZTA foam inlet fuel reforming system and a fuel reforming system with the inlet device of the present disclosure was made.

Figure 6:
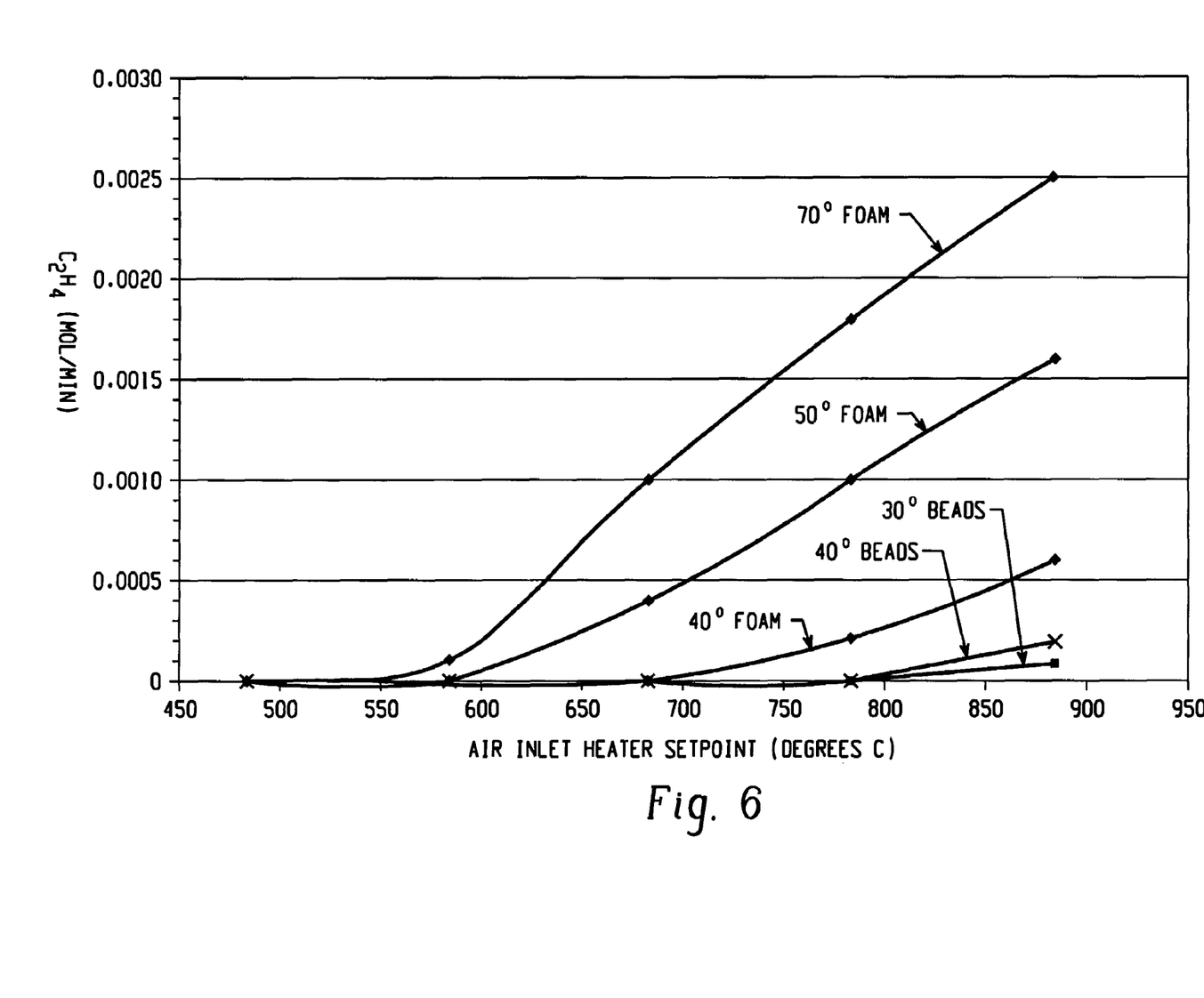
FIG. 6 is a line graph illustrating ethylene production ($C_2H_4$, mol/min) with: 70 degree ZTA foam; 50 degree ZTA foam; 40 degree ZTA foam; 30 degree inlet with beads; and 40 degree inlet with beads

The fuel reforming system of the present disclosure resulted in lower ethylene formation. As shown in FIG. 6, lower ethylene production clearly occurs in a reactor comprising the inlet device 10 comprising zirconium oxide beads within the frustoconiocal interior region having a cone angle of about 30 to about 40 degrees. As is generally known by those skilled in the art, ethylene formation is an indicator of undesirable carbon formation, such as COKE, that may deposit onto the catalyst of the reaction surface 66, second retention member 22, and various components of the system 50, thereby contributing to decreased thermal efficiencies.

The inlet device 10 of the present fuel reforming system 50 improves the mixing of gases and vapors, as well as liquids and vapors in a system which desires moving fluid from a narrow channel to a wider channel. The inlet device 10 of the present fuel reforming system 50 further improves thermal efficiency in exothermic reactions thereby converting hydrocarbon fuel such as gasoline into improved levels of $H_2$ and CO, lower levels of nitrogen oxides (NOx) and improved fuel economy when used in a spark ignited internal combustion engine.

Figure 7:
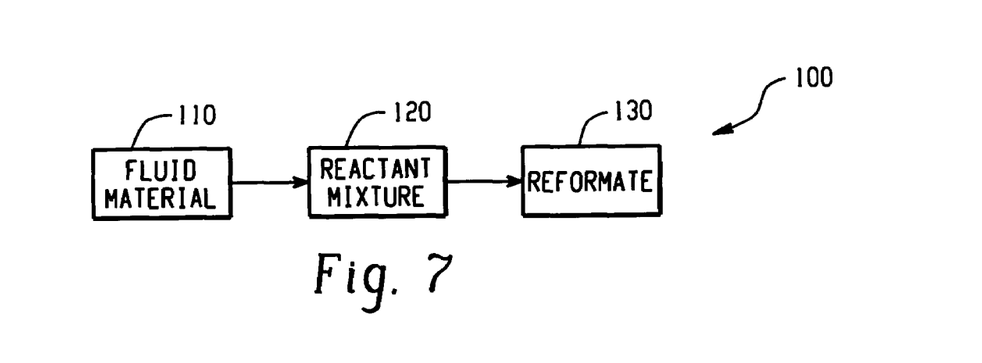
FIG. 7 is a block diagram of a method of fuel reforming according to the present invention.

Turning to FIG. 7, a block diagram of a method for mixing fluid in fuel reforming 100 is shown. The method 100 comprises providing 110 a fluid material for reforming, flowing 120 the fluid material into an inlet device comprised of a housing defining a frustoconical interior region having an inlet opening and an outlet opening, a first and a second retention member, said first retention member in fluid communication with said inlet opening and said second retention member in fluid communication with said outlet opening, and a plurality of particles contained within said frustoconical interior region between said first retention member and said second retention member, mixing 120 the fluid material to form a reactant mixture, and reacting 130 the reactant mixture with a reaction surface to form a reformate.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in specific examples are reported as precisely as possible. Any numerical value, however, inherently contain certain errors necessarily resulting from the standard deviation found in their respective testing measurements.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An inlet device for a reactor comprising:
   a housing defining a frustoconical interior region having an inlet opening and an outlet opening for the passage of at least one fluid into and out of the frustoconical interior region and subsequently into the reactor;
   a first and a second retention member, said first retention member in fluid communication with said inlet opening and said second retention member in fluid communication with said outlet opening, said first and second retention members are porous to permit fluid transfer into and out of the inlet device;
   a plurality of chemically inert particles contained within said frustoconical interior region between said first retention member and said second retention member; and
   an insulator disposed proximate to the outlet opening, wherein the insulator is heat resistant to 1100° C.

2. The inlet device of claim 1, wherein said inlet opening comprises a diameter less than a diameter of said outlet opening.

3. The inlet device of claim 1, wherein said frustoconical interior region comprises a cone angle of about 20 to about 80 degrees.

4. The inlet device of claim 1, wherein said frustoconical interior region comprises a cone angle of about 30 to about 40 degrees.

5. The inlet device of claim 1, wherein said particles are spherical in shape.

6. The inlet device of claim 1, wherein said particles are comprised of zirconium oxide.

7. The inlet device of claim 1, further comprising a tube mixer in fluid communication with said inlet opening.

8. The inlet of claim 7, wherein said tube mixer comprises a cylindrically shaped tube and a helical shaped divider longitudinally disposed within an interior region of said cylindrically shaped tube.

9. A fuel reforming system comprising:
   an inlet device for a reactor comprising a housing defining a frustoconical interior region having an inlet opening and an outlet opening for the passage of at least one fluid into and out of the frustoconical interior region and subsequently to the reactor, a first and a second retention member, said first retention member in fluid communication with said inlet opening and said second retention member in fluid communication with said outlet opening, said first and second retention members are porous to permit fluid transfer into and out of the inlet device, a plurality of chemically inert particles contained within said frustoconical interior region between said first retention member and said second retention member;

an insulator disposed proximate to the outlet opening, wherein the insulator is heat resistant to 1100° C.; and a reaction surface comprising a catalyst material, said reaction surface downstream from the insulator and in fluid communication with said outlet opening.

10. The reforming system of claim 9, further comprising a tube mixer in fluid communication with said inlet device.

11. The reforming system of claim 10, wherein the tube mixer comprises a cylindrically shaped tube and a helical shaped divider longitudinally disposed within an interior region of said cylindrically shaped tube.

12. The fuel reforming system of claim 9, further comprising at least one vaporizer upstream from the inlet device.

* * * * *